United States Patent [19]
Takehara et al.

[11] Patent Number: 5,154,443
[45] Date of Patent: Oct. 13, 1992

[54] SUSPENSION APPARATUS OF A VEHICLE

[75] Inventors: Shin Takehara; Toshiki Morita, both of Hiroshima, Japan

[73] Assignee: Mazda Motor Corporation, Hiroshima, Japan

[21] Appl. No.: 589,603

[22] Filed: Sep. 28, 1990

[30] Foreign Application Priority Data

Sep. 29, 1989 [JP] Japan .................................. 1-254820

[51] Int. Cl.[5] .............................................. B60G 11/26
[52] U.S. Cl. ...................................... 280/707; 280/714
[58] Field of Search ................. 280/714, 707, 709, 708

[56] References Cited

U.S. PATENT DOCUMENTS 4,953,890  9/1990  Kamimura ........................ 280/707
4,967,360 10/1990  Fukunaga et al. ................ 280/707
4,978,135 12/1990  Edahiro et al. .................... 280/714

Primary Examiner—Mitchell J. Hill
Assistant Examiner—Paul Dickson
Attorney, Agent, or Firm—Fish & Richardson

[57] ABSTRACT

A suspension apparatus of an automotive vehicle controls a posture of the vehicle body by controlling supply and discharge of an operating liquid to and from a cylinder unit interposed at each of the wheels between a sprung weight and an unsprung weight. The pressure within a high-pressure line for supplying the operating liquid of a high pressure to the cylinder units is released to the reservoir tank at a faster speed when a trouble occurs which cannot normally perform a control of the posture of the vehicle body and at a slower speed when an ignition switch has been turned off.

23 Claims, 12 Drawing Sheets

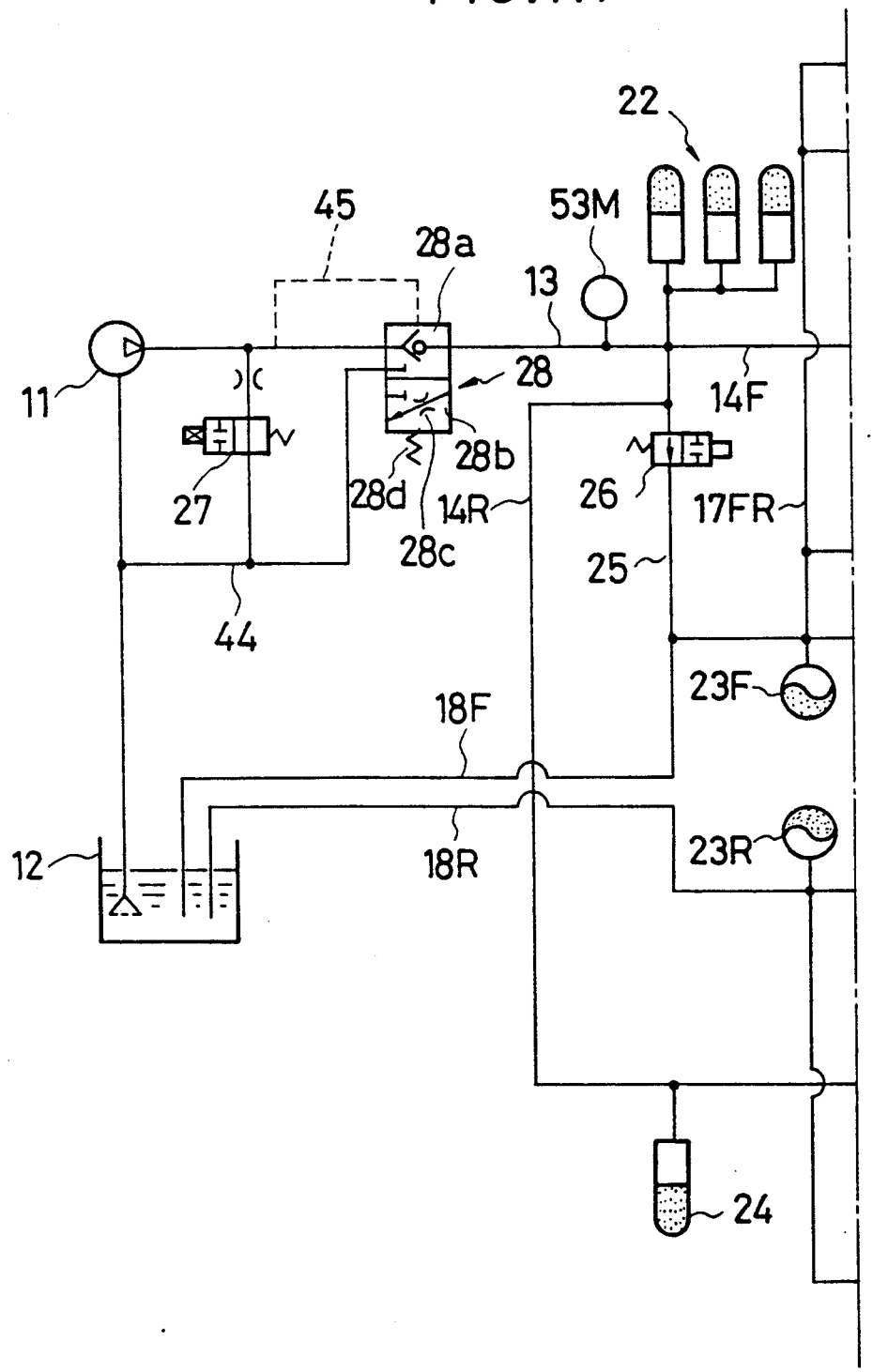

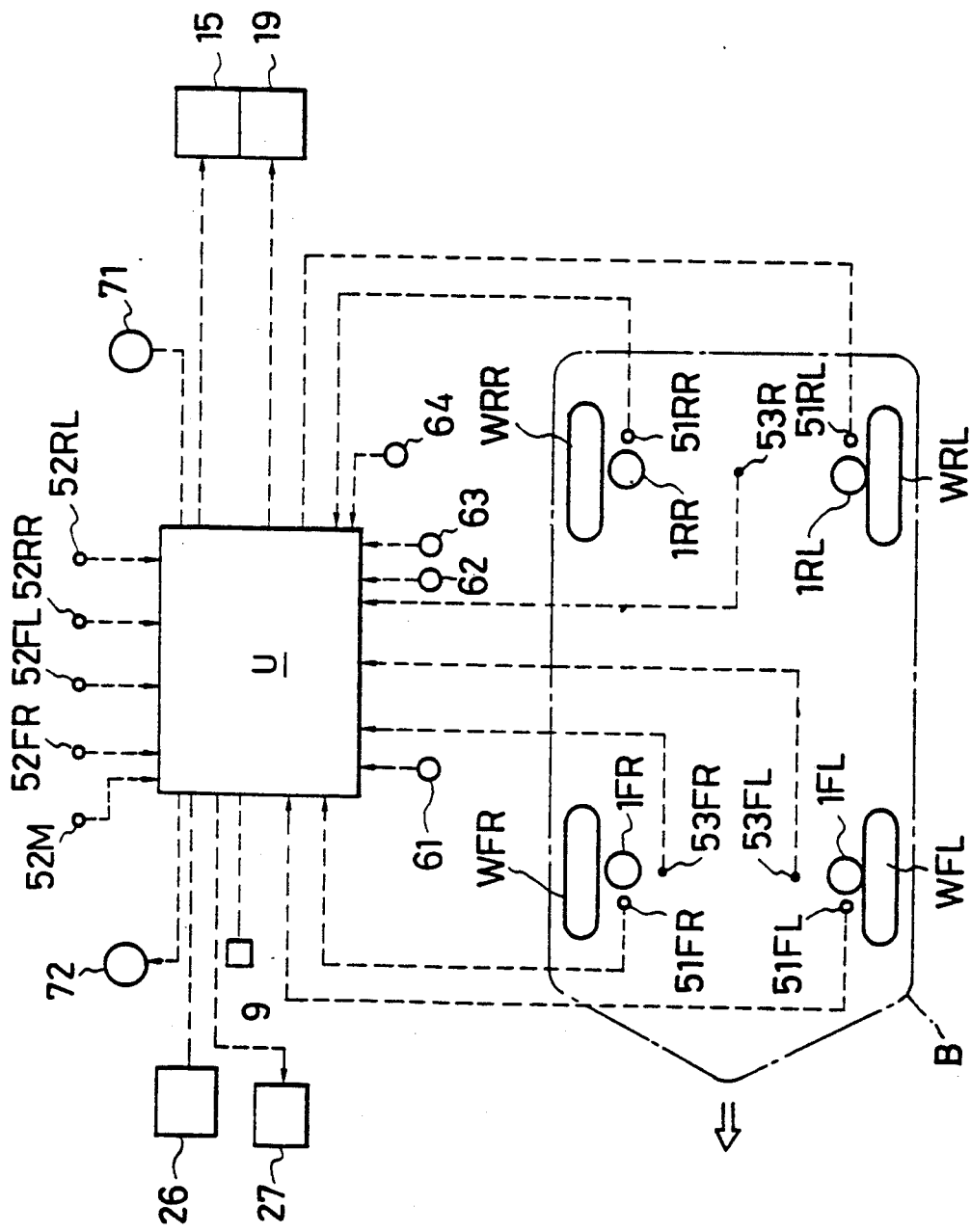

FIG.4A
FIG.4
| FIG.4A | FIG.4B |
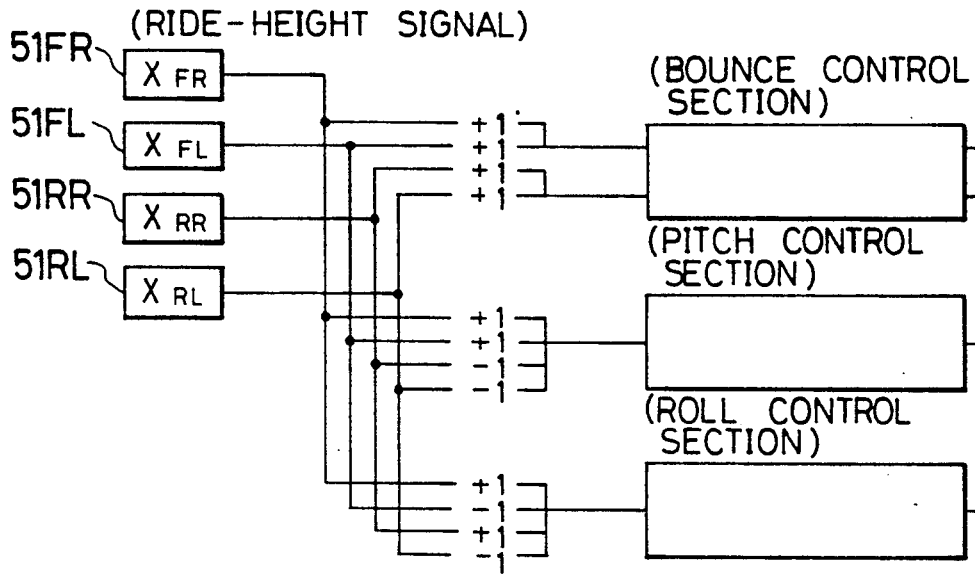
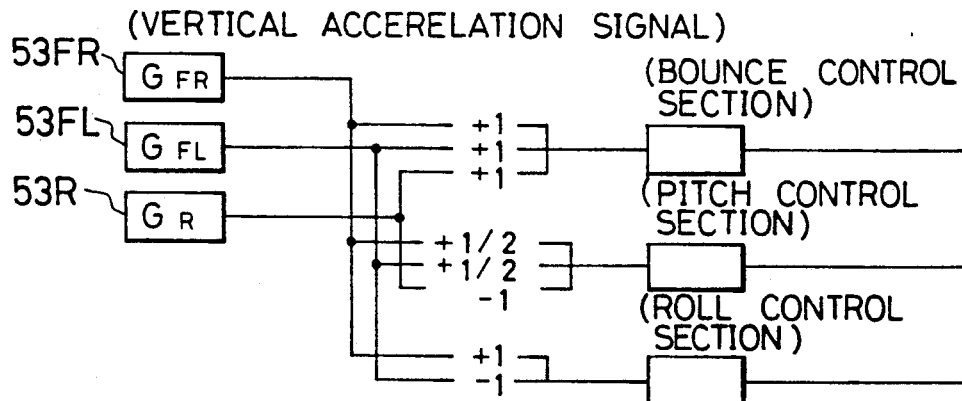
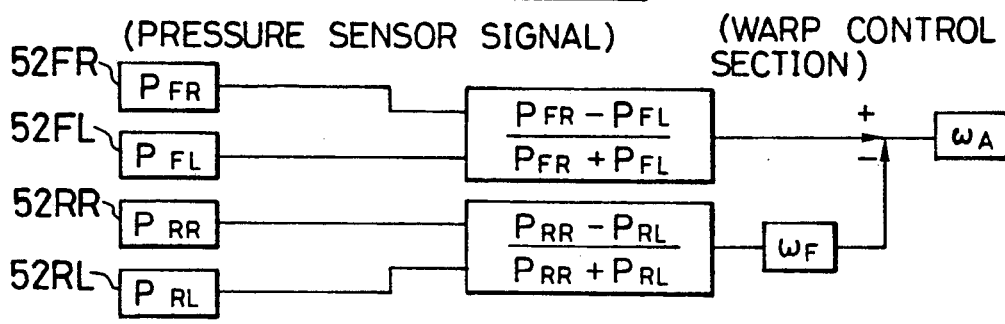

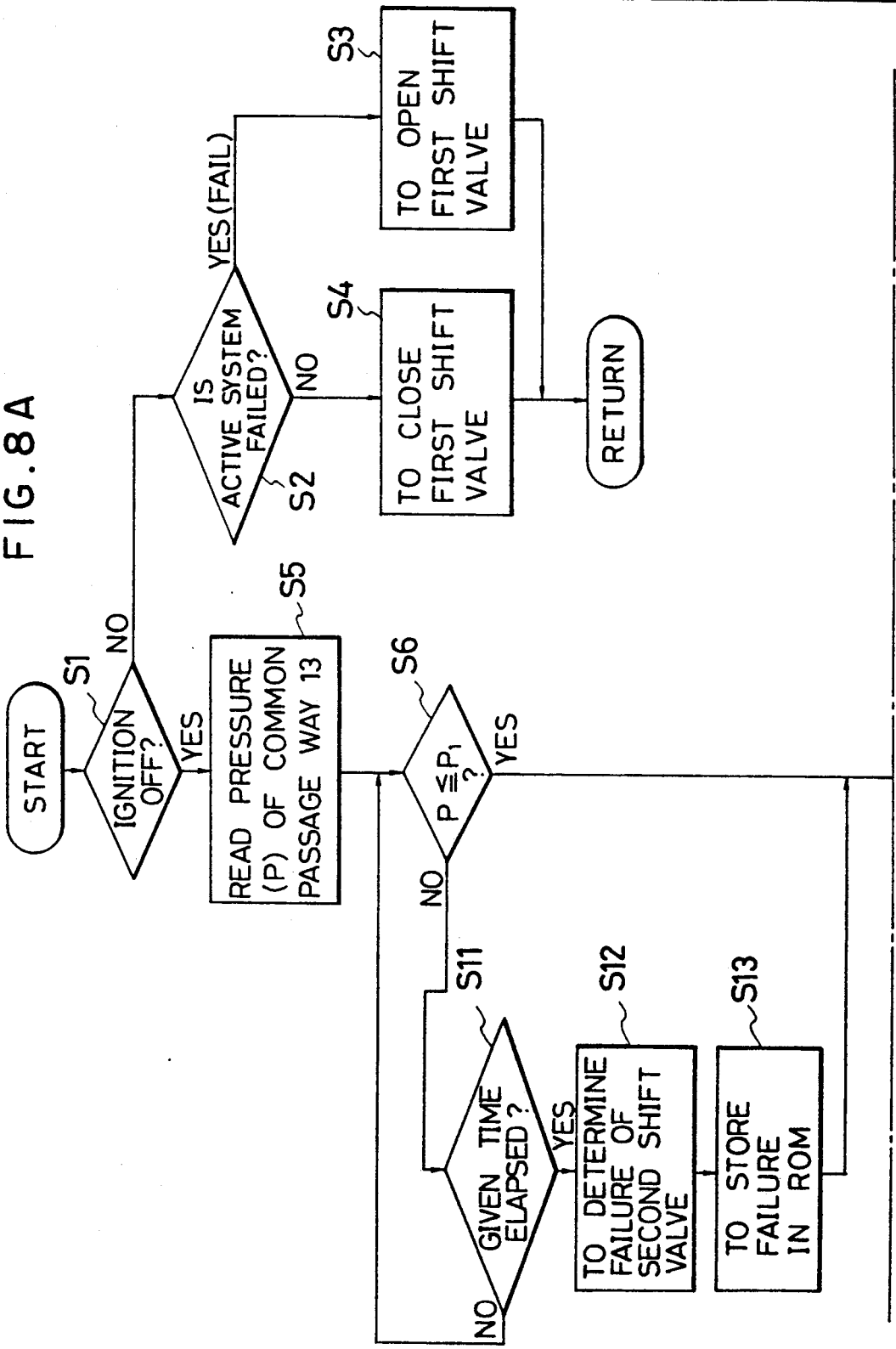

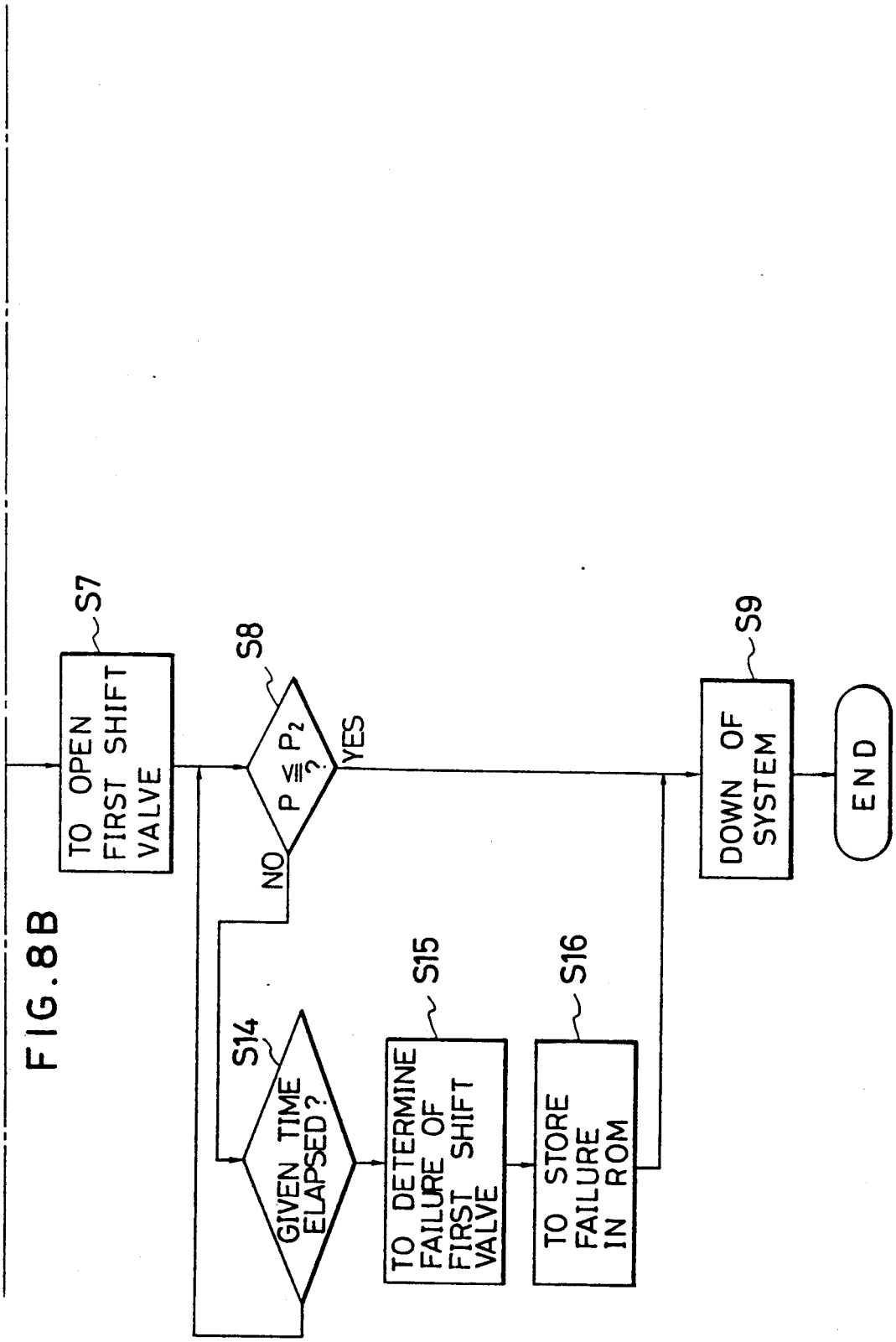

SUSPENSION APPARATUS OF A VEHICLE

BACKGROUND OF THE INVENTION

1. Field of the Invention

The present invention relates to a suspension apparatus of an automotive vehicle.

2. Description of the Related Art

A suspension apparatus of an automotive vehicle, as is generally called a passive suspension, has a damper unit comprising a hydraulic damper and a spring (generally called a coil spring), and suspension characteristics are equally set on the basis of predetermined characteristics of the damper unit. Although a damping force of the hydraulic damper can be variable, this cannot change the suspension characteristics to a large extent.

Recently, a suspension apparatus, as called an active suspension, has been proposed, which allows a change in the suspension characteristics in an arbitrary fashion. This active suspension is basically designed so as to control the suspension characteristics by controlling the supply and the discharge of an operating liquid to or from a cylinder unit interposed between a sprung weight and an unsprung weight.

In the active suspension, the suspension characteristics can be changed to a great extent by supplying or discharging the operating liquid from or to the outside, in order to perform a variety of controls such as ride height control, roll control, pitch control, etc.

Hence, the active suspension requires a circuit for supplying and discharging the operating liquid to and from its cylinder unit, whose supplying and discharging circuit in turn comprises at least a reservoir tank for storing the operating liquid, a pump for pumping up the operating liquid stored in the reservoir tank, a high-pressure line for supplying the operating liquid of a high pressure forced out from the pump to the cylinder unit, and a low-pressure line for returning the operating liquid in the cylinder to the reservoir tank. Further, the high-pressure pressure line is provided with a control valve for supplying the operating liquid while the low-pressure line is provided with a control valve for discharging the operating liquid, thereby permitting a control of the supply and the discharge of the operating liquid to and from the cylinder unit and, as a result, a control of the posture of the vehicle body.

It can be noted herein that, if the operating liquid of a high pressure remains within the high-pressure line when an ignition switch is turned off, there is the possibility that the cylinder unit may be operated to some extent due to the operating liquid of a high pressure left within the cylinder unit. For instance, if some of the operating liquid leaks from the control valve for supplying the operating liquid, the operating liquid of a high pressure is supplied to the cylinder unit corresponding to the control valve from which the operating liquid leaks while the vehicle is parked, and consequently the height of the vehicle body may be partially elevated.

Furthermore, the way of competing with the situation during a trouble in which no active control can be performed in a normal way is one of the problems which are sought to be solved. Therefore, the measure to be taken in that situation has been desired from a fail-safe standpoint.

SUMMARY OF THE INVENTION

The present invention has the object to provide a suspension apparatus of an automotive vehicle adapted to prevent an undesirable variation in the height of the vehicle body after the ignition switch has been turned off, as well as to safely compete with the situation in which the active control is brought into trouble.

In order to achieve the object, an aspect of the present invention consists of a suspension apparatus of an automotive vehicle having a cylinder unit interposed between a sprung weight and an unsprung weight for performing a control of a posture of a vehicle body by controlling supply or discharge of an operating liquid to or from the cylinder unit under a predetermined condition, comprising:

a reservoir tank for storing the operating liquid;

a high-pressure line for supplying the operating liquid of a high pressure to the cylinder unit;

a pump for pumping the operating liquid up from the reservoir tank and supplying the operating liquid of a high pressure to the high-pressure line;

a trouble detecting means for detecting a trouble which causes the supply or discharge of the operating liquid to or from the cylinder unit in a normal fashion;

an ignition switch detecting means for detecting an off state of an ignition switch; and a pressure releasing means for releasing a pressure within the high-pressure line to the reservoir tank at a faster speed when the trouble is detected by the trouble detecting means and for releasing the pressure within the high-pressure line to the reservoir tank at a slower speed when an off state of the ignition switch is detected by the ignition switch detecting means.

In another aspect, the present invention consists of a suspension apparatus of an automotive vehicle, comprising:

a plurality of cylinder units, each of the cylinder units being interposed between a sprung weight and an unsprung weight;

a reservoir tank for storing an operating liquid;

a pump for pumping the operating liquid up from the reservoir tank and functioning as a source of supplying the operating liquid of a high pressure;

a high-pressure line for connecting the pump to the cylinder units, to which the operating liquid of a high pressure pumped up by the pump is supplied;

a supplying control valve connected to the high-pressure line;

a low-pressure line for connecting the reservoir tank to the cylinder units;

a discharging control valve connected to the low-pressure line;

a plurality of ride height detecting means, each ride height detecting means for detecting a ride height, or a height of the vehicle body, in a position at each of the respective wheels;

a posture control means for determining an actual posture of the vehicle body on the basis of the ride heights detected by the plurality of the ride height detecting means and for controlling the supplying control valve and the discharging control valve so as for the actual posture of the vehicle body determined to become a predetermined posture thereof;

a trouble detecting means for detecting a trouble which causes supply and discharge of the operating liquid to and from the cylinder unit to occur in an abnormal fashion;

an ignition switch detecting means for detecting an off state of an ignition switch; and a flow-rate altering means for releasing a pressure within the high-pressure line to the reservoir tank at a faster speed when the trouble is detected by the trouble detecting means and for releasing the pressure within the high-pressure line to the reservoir tank at a slower speed when an off state of the ignition switch is detected by the ignition switch detecting means.

With the arrangement in the manner as described hereinabove, the suspension apparatus according to the present invention can with certainty prevent the occurrence of an undesirable situation at least in which the height of the vehicle body is carelessly elevated when the ignition switch is turned off and when the trouble would occur to such an extent that no active control can be performed in a normal way, because the pressure within the high-pressure line is released into the reservoir tank. In other words, this arrangement for the suspension apparatus according to the present invention can certainly block a movement of the vehicle body in the direction of elevating the height of the vehicle body. This elevation is not desirable from a standpoint of safety or of ensuring safety of the vehicle body.

Further, the present invention can prevent a shock from occurring due to a water-hammer phenomenon, thereby avoiding anxiety from an operator upon getting off the vehicle, because the pressure is released from the high pressure line into the reservoir tank, when the ignition switch is turned off.

When the trouble has occurred, the pressure is quickly released from the high-pressure line, so that safety can be ensured quickly.

Other objects, features and advantages of the present invention will become apparent in the course of the description of the preferred embodiments, which follows, in conjunction with the accompanying drawings.

BRIEF DESCRIPTION OF THE DRAWINGS

FIGS. 1A and 1B together form a diagrammatic representation outline of a circuit of an active suspension.

FIG. 3 is a diagrammatic representation of a control system of the circuit of FIG. 1.

FIGS. 4A and 4B taken together and FIG. 5 are diagrammatic representations of outlines of systems for performing active control.

FIGS. 8A and 8B together illustrate a flow chart showing a control example of the suspension apparatus according to the present invention.

FIGS. 9 and 10 illustrate another embodiment of the present invention in which FIG. 9 is a diagrammatic representation of an essential portion of the embodiment and FIG. 10 is a flow chart showing the control example of the embodiment.

FIGS. 11 and 12 illustrate a further embodiments of the present invention in which FIG. 11 is a diagrammatic representation of an essential portion of the further embodiment and FIG. 11 is a flow chart showing the control example of the further embodiments.

DETAILED DESCRIPTION OF THE PREFERRED EMBODIMENTS

Figure 1B:
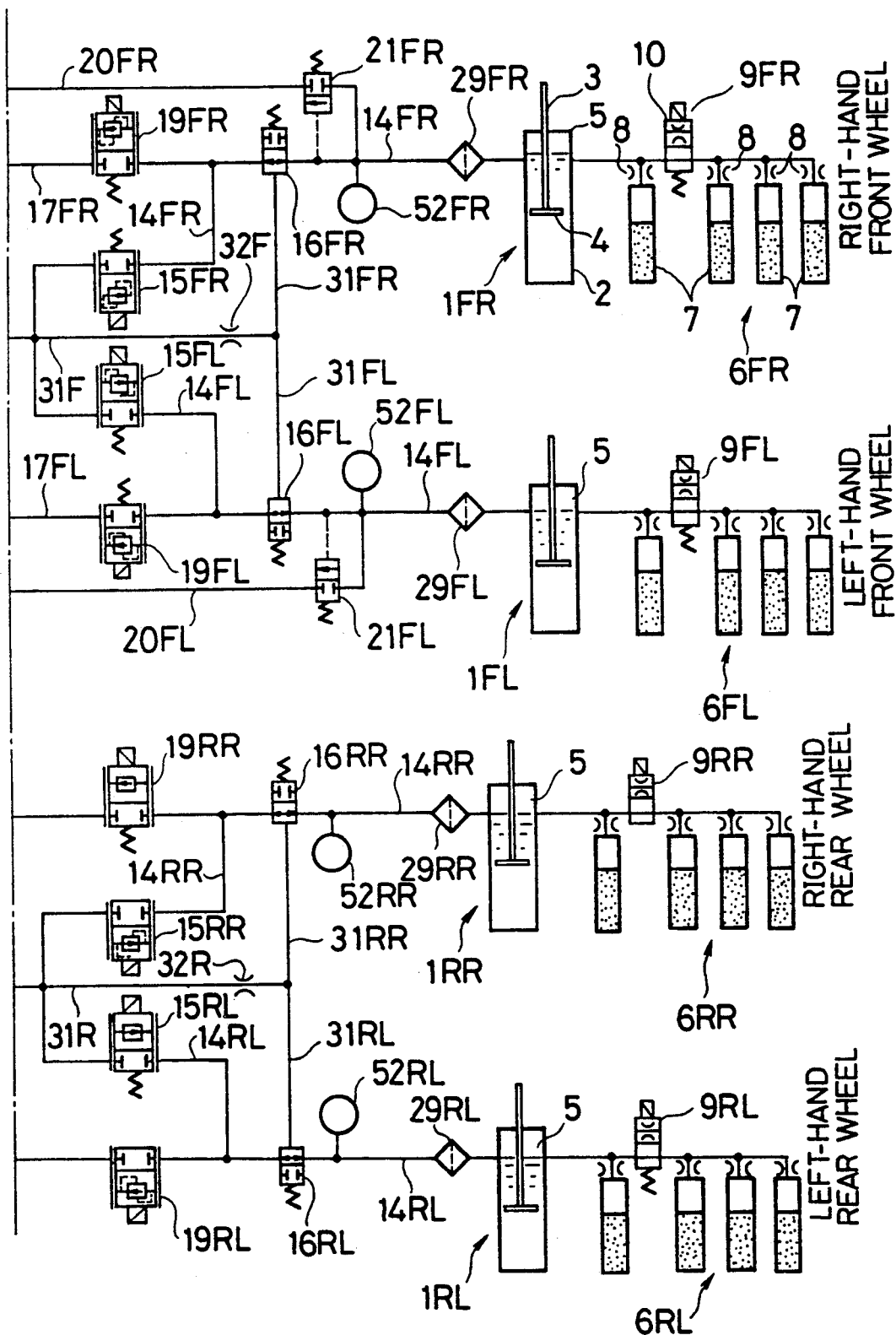

The present invention will be described more in detail by way of examples in conjunction with the accompanying drawings.

In the following description and the accompanying drawings, reference symbol "F" stands for a front wheel and "R" stands for a rear wheel, as well as reference symbol "FR" stands for a right-hand front wheel, "FL" for a left-hand front wheel, "RR" for a right-hand rear wheel, and "RL" for a left-hand rear wheel. When the front and rear wheels as well as the right-hand and left-hand wheels are not needed to be distinguished, reference numerals are referred to without using these reference symbols.

Operating Liquid Circuit

As shown in FIG. 1, reference numeral 1 denotes a cylinder unit which is mounted to each of the wheels, a cylinder unit mounted to the right-hand front wheel being referred to as 1FR, a cylinder unit mounted to the left-hand front wheel as 1FL, a cylinder unit mounted to the right-hand rear wheel as 1RR, and a cylinder unit mounted to the left-hand rear wheel as 1RL. Each of these cylinder units comprises a cylinder 2 connected to the unsprung weight and a piston rod 3 extending from the inside of the cylinder 2 and connected to the sprung weight. The cylinder 2 comprises the piston rod 3, a piston 4 integral with the piston rod 3, a liquid chamber 5 disposed upward and defined by the piston 4 and a lower chamber disposed downward of the liquid chamber 5 and communicated therewith. This structure allows the piston rod 3 to extend raising a ride height of the vehicle body when an operating liquid is fed to the liquid chamber 5 while lowering the height of the vehicle body when the operating liquid is discharged from the liquid chamber 5.

To the liquid chamber 5 of each cylinder unit 1 is connected a gas spring 6 (6FR, 6FL, 6RR, and 6RL) which comprises four cylindrical springs 7 of a small diameter and the four cylindrical springs 7 are arranged in a row, or in parallel to each other, and connected to the liquid chamber 5 through orifices 8. Three of the four cylindrical springs 7 are further connected to the liquid chamber 5 through a shift valve 9. This arrangement enables the four cylindrical springs 7 to be communicated with each other only through the orifices 8 when the shift valve 9 is located in a shift position as shown in the drawing, thereby making a damping force smaller a this time. When the shift valve 9 is shifted from the position as shown in the drawing, the three cylindrical springs 7 can be communicated with each other through an orifice 10 incorporated in the shift valve 9, too, thereby making a damping force larger. It is to be noted as a matter of course that the displacement of the shift positions of the shift valve 9 changes spring characteristics of the gas spring 6. Furthermore, it is to be noted that suspension characteristics can also be changed by an amount of the operating liquid to be fed to the liquid chamber 5 of the cylinder unit 1.

Referring to FIG. 1, reference numeral 11 denotes a pump to be driven by the engine, and the pump 11 pumps a high-pressure operating liquid up from a reservoir tank 12 and discharges the liquid into a common passage 13 as a supply path. The common passage 13 is branched into a forward passage 14F and a rearward passage 14R, the forward passage 14F being further branched into a right-hand forward passage 14FR and a left-hand forward passage 14FL. The right-hand forward passage 14FR is connected to the liquid chamber 5 for the right-hand front wheel cylinder unit 1FR and the left-hand forward passage 14FL is connected to the liquid chamber 5 of the left-hand front wheel cylinder unit 1FL. To the right-hand forward passage 14FR are connected on the upstream side a flow rate (amount) control valve 15FR for supplying the operating liquid and on the downstream side a pilot valve 16FR as a delay valve. To the left-hand forward passage 14FL are likewise connected on the upstream side a flow rate (amount) control valve 15FL for supplying and on the downstream side a pilot valve 16FL.

To the right-hand forward passage 14FR is connected a first relief passage 17FR for the right-hand forward passage in a position between the supply flow rate control valves 15FR and 15FL, and the first relief passage 17FR leads eventually to the reservoir tank 12 through a relief passage 18F for the front wheels. To the first relief passage 17FR is connected a discharge flow rate (amount) control valve 19FR. The right-hand forward passage 14FR disposed on the downstream side of the pilot valve 16FR is connected through a second relief passage 20FR as a bypass bypassing the discharging flow rate (amount) control valve 19FR to the first relief passage 17FR which in turn is connected to a relief valve 21FR. The right-hand forward passage 14FR is provided with a filter 29FR in a position close to the cylinder unit 1FR. The filter 29FR is disposed in a position between the pilot valve 16FR disposed closer to the cylinder unit 1FR and the relief valve 21FR, functioning as preventing dust abraded or worn off as a result of abrasion and so on from flowing toward the pilot valve 16FR and the relief valve 21FR.

It is to be noted that the arrangement for the passages for the left-hand forward wheel is substantially the same as that for the right-hand forward wheel as have been described hereinabove, so that duplicate description thereon will be omitted herefrom for a brevity of explanation.

To the common passage 13 is connected a main accumulator 22, and to the front-wheel relief passage 18F is connected an accumulator 23F. The main accumulator 22 serves as a source of accumulating pressures for the operating liquid in association with a sub-accumulator 24, as will be described hereinafter, and it functions as preventing an amount of the operating liquid to be supplied to the cylinder unit 1 from running short. The accumulator 23F prevents the high-pressure operating liquid in the cylinder units 1 for the front wheels from being discharged rapidly to the reservoir tank 12 of a low pressure, namely, prevents a so-called water-hammer phenomenon.

The passages for supplying or discharging the operating liquid to or from the cylinder units 1RR and 1RL for the rear wheels are constructed in a way similar to those for the front wheels so that a duplicate description will be omitted from the description which follows. It is to be noted, however, that the passages for the rear wheels are provided with no valves corresponding to the pilot valves 21FR and '21FL for the respective cylinder units 1FR and 1FL and that the rear-wheel passage 14R is provided with the sub-accumulator 24 with the fact taken into account that the length of its rear-wheel passage from the main accumulator 22 becomes longer than that of the front-wheel passage.

In this embodiment, as described hereinabove, the passages 13, 14F, 14FR, 14FL, 14R, 14RR and 14RL constitute the high-pressure line, while the passages 17FR, 17FL, 18F, 17RR, 17RL and 18R constitute the low-pressure line.

As shown further in FIG. 1, reference numeral 27 denotes an unload valve which serves as adjusting the discharging pressure from the pump 11 so as to exist within a predetermined scope. The unload valve 27 is allowed to open when the pressure in the common passage 13 exist within the predetermined pressure ranging from 120 to 160 kg/cm$^2$, thereby releasing the pressure discharged from the pump 11 to the release passage 44 communicated with the reservoir tank 12. Reference numeral 28 denotes a switch valve which serves as a second switch valve and comprises a check valve 28a and a release valve 28b which in turn is provided with a variable orifice 28c. To the switch valve 28 is supplied a pilot pressure from the pilot passage 45 connected to the downstream portion of the unload valve 27.

The pilot valve 16 is shifted so as to be opened or closed in accordance with a differential pressure between the pressure of the front-wheel passage 14F or the rear-wheel passage 14R, namely, the common passage 13, and the pressure on the side of the cylinder unit 1. At this end, the front-wheel passage 14F is branched into the front-wheel common pilot passage 31F which, in turn, is branched into two branch passages 31FR and 31FL, and the right-hand front wheel branch passage 31FR is connected to the right-hand pilot valve 16FR while the left-hand branch passage 31FL is connected to the left-hand pilot valve 16FL. The common pilot passage 31F is provided with an orifice 32F. A pilot passage for the rear wheels is arranged like the pilot passage 31F for the front wheels.

Figure 2:
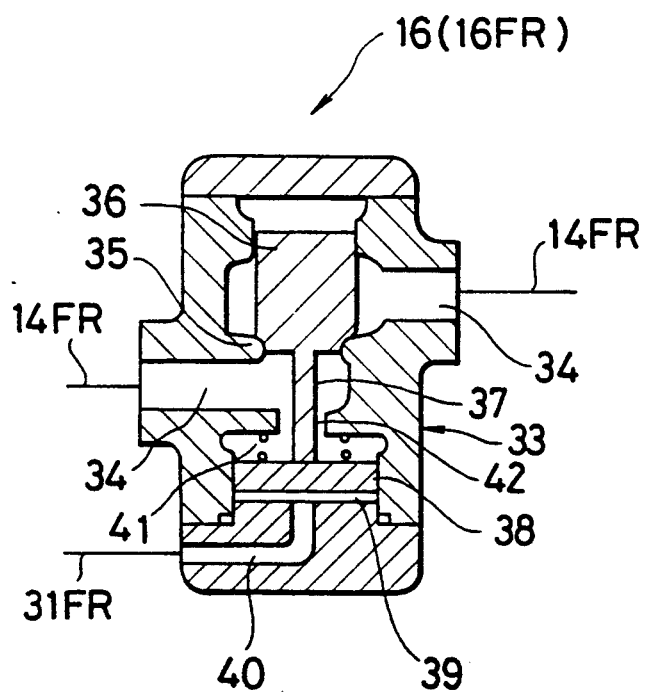
FIG. 2 is a view in section showing an example of a pilot valve of FIG. 1.

Each of the pilot valves 16 may be constructed as shown in FIG. 2. The pilot valve 16 for the right-hand front wheel is shown in FIG. 2 and has a main flow passage 34 within a casing 33 so as to constitute part of the right-hand forward passage 14FR to which the main flow passage 34 is connected. In an intermediate position of the main flow passage 34 is disposed a valve seat 35 so as to allow a switching piston 36 slidably inserted into the casing 33 to be seated on the valve seat 35 or separated therefrom, thereby closing or opening the piston valve 16FR.

The switching piston 36 is formed integrally with a control piston 38 through a valve stem 37. The control piston 38 is slidably inserted in the casing 33 and defines a liquid chamber 39 in the casing 33. The liquid chamber 39 is then connected to the branch pilot passage 31FR through a control flow passage 40. The control piston 36 is biased by a return spring 41 in the direction in which the switching piston 36 is being seated on the valve seat 35, in other words, in which the pilot valve 16FR is closed. Furthermore, the control piston 38 is designed such that the pressure of the main flow passage 34 acts upon the control piston 38 on the side opposite to the liquid chamber 39 through a communication hole 42. This arrangement allows the switching piston 36 to be seated on the valve seat 35 to close the pilot valve 16FR when the pressure in the liquid chamber 39 on the side of the common passage 13 has declined to one quarter or less than the pressure in the main flow passage 34 on the side of the cylinder unit 1FR.

It is noted herein that, when the pressure on the side of the common passage 13 declines to a large extent from the state in which the pilot valve 16FR is open, this decline in the pressure is delayed by the action of the orifice 32F and then transmitted to the liquid chamber 39, whereby the closure of the pilot valve 16FR is delayed after the decline in the pressure. It is to be provided that this delay time is set to about one second in this embodiment.

Pressure Releasing Circuit in High-Pressure Line

The common passage 13, namely, the front-wheel passage 14F and the rear-wheel passage 14R, is communicated with the relief passage 18F for the front wheel through the relief passage 25, and the control valve 26 functioning as a first switch valve and constituted by an electromagnetically switching valve is connected to the relief passage 25. This construction constitutes part of the passage for communicating the high-pressure line with the reservoir tank 12 by utilizing the low-pressure line 18F. It is also to be noted that this open passage to which the control valve 26 is connected may be constituted as one that is thoroughly independent from the low-pressure line.

Further, the common passage 13 is communicated with the open passage 44 when the switch valve 28 is in a mode of opening its release valve 28b functioning as a second switching valve.

Actions of all the valves will be described in more detail hereinafter.

(1) Shift valve 9

The shift valve 9 is shifted to make a damping force greater only during cornering in this embodiment.

(2) Relief valve 21

The relief valve 21 is closed under constant conditions and opened as the pressure on the side of the cylinder unit 1 reaches a given value or higher. In this embodiment, the given value is set to 160 to 200 kg/cm². In other words, this valve serves as a safety valve for preventing an abnormal rise in the pressure on the side of the cylinder unit 1.

It is noted that the relief valve 21 may be mounted to the cylinder units 1RR and 1RL for the rear wheels, however, in this embodiment, the relief valve 21 is not mounted on the side of the rear wheels with the fact taken into account that the vehicle body is designed such that the pressure on the side of the rear wheels does not become larger than that on the side of the front wheels on condition that the weight on the front side of the vehicle body is allotted considerably heavier than that on the rear side thereof.

(3) Flow rate (amount) control valves 15 and 19

The supply rate (amount) control valve 15 and the discharge flow rate (amount) control valve 19 each are spool valves of an electromagnetic type and switched from a closed state to an open state or vice versa. It is provided, however, that the flow amount control valves 15 and 19 are provided with a pressure-differential control mechanism so as to make a difference between the pressure on the upstream side and that on the downstream side substantially constant when they are in an open state, because a constant pressure differential is required for a control over the flow rate or amount. More specifically, the flow amount control valves 15 and 19 are designed so as to vary with the positions of their spools, namely, with the opening angles thereof, in which their spools displace in proportion to the current to be supplied. The current to be supplied is determined on the basis of a map in advance prepared and stored, which represents the relationship of the flow amount with the current. In other words, the current is supplied in correspondence with the flow amount or rate required at that time.

The flow amount control valves 15 and 19 control the supply or discharge of the operating liquid to or from the cylinder unit 1, thereby resulting in the control of suspension characteristics.

In addition thereto, when an ignition switch is in an OFF state, control is carried out only for lowering the ride height of the vehicle body for a given period of time (in this embodiment, the period of time being set to two minutes) from the time when the ignition switch was turned OFF. In other words, in order to maintain a reference ride height of the vehicle body, the ride height of the vehicle body is prevented from becoming partially higher upon a change in a load resulting from getting out or for other reasons.

(4) Control valve 26

The control valve 26 is closed by excitation at ordinary time and opened at the fail time. For instance, the fail time may include, for example, the time when a portion of the flow amount control valve 15 or 19 is fixed, the time when a sensor or other unit as will be described hereinafter gets out of order, the time when the liquid pressure of the operating liquid becomes lost or insufficient, the time when the pump 11 gets out of order, and so on.

In this embodiment, on top of that, the control valve 26 is opened in a given period of time, for example, in two minutes, after the ignition switch was turned OFF.

It is to be noted herein that, when the control valve 26 is opened, the closure of the pilot valve 16 is delayed, as have been described hereinabove.

(5) Pilot valve 16

As have been described hereinabove, the opening of the pilot valve 16 is delayed due to the action of the orifices 32F and 32R after the pressure in the common passage 13 has been decreased. At the fail time, for example, when a portion of the flow amount control valve 15 is kept open, this arrangement allows the passages 14FR, 14FL, 14RR and 14RL to be closed on account of a decrease in the pilot pressure resulting from the opening operation of the control valve 26, thereby shutting off the operating liquid within the cylinder units 1FR, 1RL, 1RR and 1RL, respectively, and consequently maintaining the ride height of the vehicle body. It is noted as a matter of course that the suspension characteristics at this time are fixed in a so-called passive fashion.

(6) Switch valve 28

When the ignition switch is turned on and the pump 11 is operating, namely, when the engine is operatively working, on the one hand, the switch valve 28 assumes a mode in which the check valve 28a acts upon the common passage 13 in response to the pilot pressure. When the ignition switch is turned off, on the other hand, the release valve 28b of the switch valve 28 is opened by means of a biasing force of the spring 28d. It is to be noted herein that the biasing force of the spring 28d is set to a pressure equal to or lower than the pilot pressure to act at the unload time, namely, to the pressure ranging from 5 to 10 kg/cm², thereby preventing the release valve 28 from being opened unnecessarily at the unload time.

Control System

FIG. 3 represents a control system of the operating liquid circuit as shown in FIG. 1.

As shown in FIG. 3, reference symbol "WFR" stands for a right-hand front wheel, "WFL" for a left-hand front wheel, "WRR" for a right-hand rear wheel, and "WRL" for a left-hand rear wheel. Reference symbol "U" denotes a control unit comprised of a microcomputer. Signals enter into the control unit U from ride height sensors 51FR, 51FL, 51RR and 51RL, pressure sensors 52FR, 52FL, 52RR, and 52RL, vertical acceleration (G) sensors 53FR, 53FL and 53R, a pressure sensor 52m, a vehicle speed sensor 61, a steering speed sensor 62, a transverse acceleration sensor 63, and an operating-lever position detecting sensor 64 as well as ON and OFF signals from an ignition switch 71. The control unit U generates signals to the switch valves 9 (9FR, 9FL, 9RR, 9RL), the supply flow rate (amount) control valves 15 (15FR, 15FL, 15RR, 15RL), the discharge flow rate (amount) control valves 19 (19FR, 19FL, 19RR, 19RL), the control valve 26, an unload valve 27, and an alarm 72 such as an alarming lamp, buzzer or the like.

The ride height sensors 51FR, 51FL, 51RR and 51RL are mounted to the respective cylinder units 1FR, 1FL, 1RR and 1RL and are to detect ride heights in the positions of the respective wheels by sensing an amount of elongation thereof. The pressure sensors 52FR, 52FL, 52RR and 52RL are to sense the pressures in the liquid chamber 5 of the respective cylinder units 1FR, 1FL, 1RR and 1RL (see FIG. 1, too). The vertical acceleration sensors 53FR, 53FL and 53R are to sense the vertical acceleration, or acceleration in the vertical direction or a vertical component of acceleration. The vertical acceleration sensors 53FR and 53FL are mounted on the forward side of the vehicle B in approximately symmetrical positions on the axis of the front wheels and the vertical acceleration sensor 53R is mounted on the rearward side of the vehicle B on the axis of the rear wheels in a middle position from the left and right sides. These positions of the three vertical acceleration sensors defines a virtual plane representing the vehicle body B, which is an approximately horizontal plane—in other words, so as to be located at substantially the same height. The pressure sensor 52m, is to sense the pressure within the common passage 13. The vehicle speed sensor 61 is to sense the vehicle speed, and the steering speed sensor 62 is to sense the speed of operating the steering wheel, i.e., a steering speed. Actually, the steering speed is calculated by detecting the steering angel and operating the steering angle detected. The transverse acceleration sensor 63 is to sense the transverse acceleration, or acceleration in the transverse direction or the transverse component of acceleration, and it is mounted by only one, in this embodiment, on the Z-axis of the vehicle body. The sensor 64 is to sense the position of the operating lever for shifting the speed range positions of the automatic transmission and it can sense the shift from the speed range position P or N to the driving range.

Figure 4B:
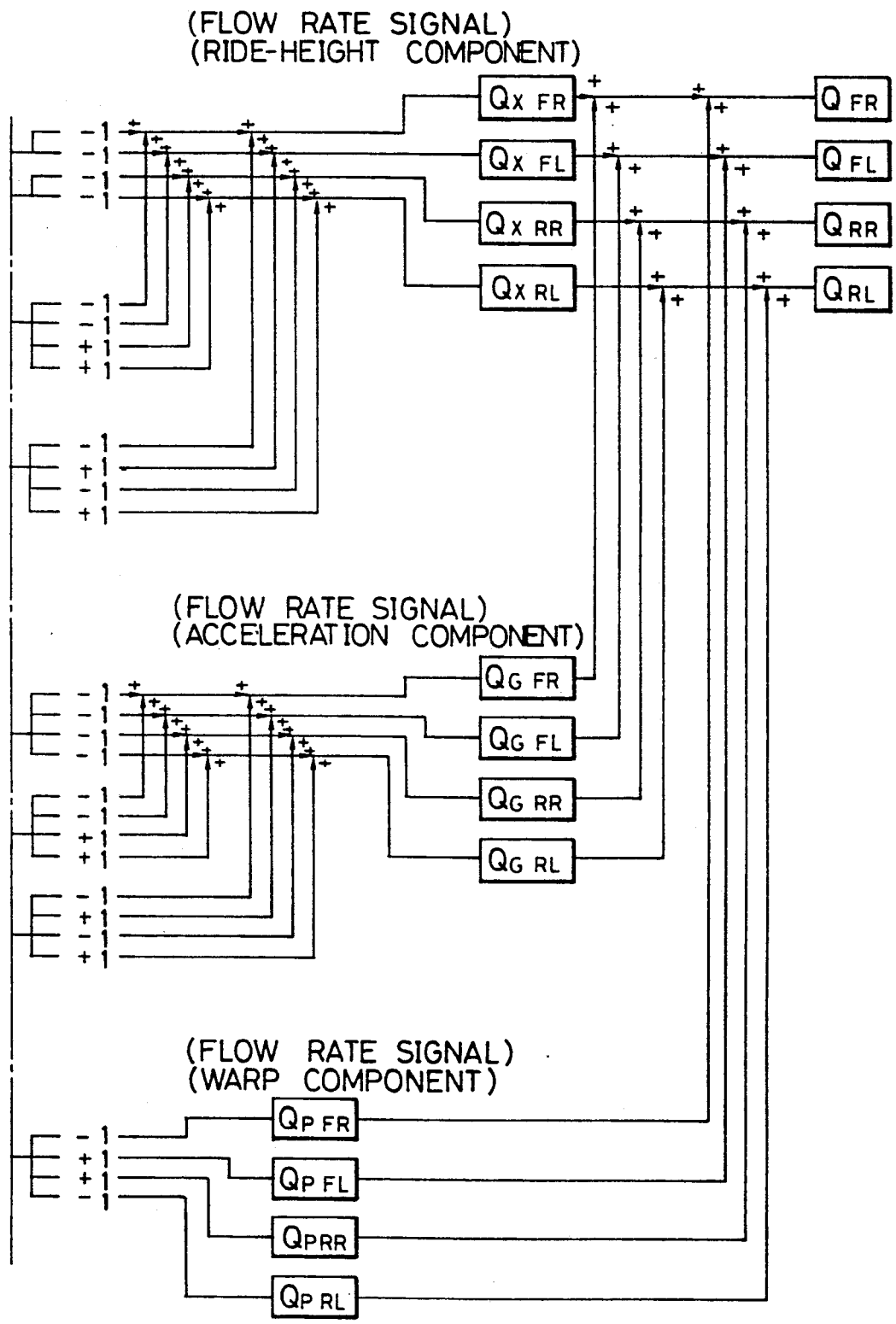

The control unit U basically performs active control, as conceptually shown in FIGS. 4A and 4B. In this embodiment, the active control includes a posture control of the vehicle (ride height signal control), a ride comfort control (vertical acceleration signal control), and a warp control of the vehicle body (pressure signal control). The results of these controls are eventually represented by flow rates or flow amounts of the operating liquid passing through the flow amount (rate) control valves 15 and 19.

Active Control

Description will now be made of an example of a control over the suspension characteristics on the basis of the output of each sensor in conjunction with FIGS. 4 and 5.

The contents of the control may roughly be broken down into three control modes for the posture control over the vehicle body B on the basis of the output from the ride-height sensor, the ride comfort control on the basis the output from the vertical acceleration (G) sensors, and the warp control of the vehicle body B on the basis of the output of the pressure sensor. Each of the control modes will be described in more detail hereinafter.

(1) Posture control (control over signals from ride-height sensors)

This control mode comprises three control sub-modes consisting of a control over three components of the posture of the vehicle body, namely, a bounce component, a pitch component, and a roll component, each of which may be regulated by a feedback control on the basis of a PD control (proportional-differential control).

Figure 5:
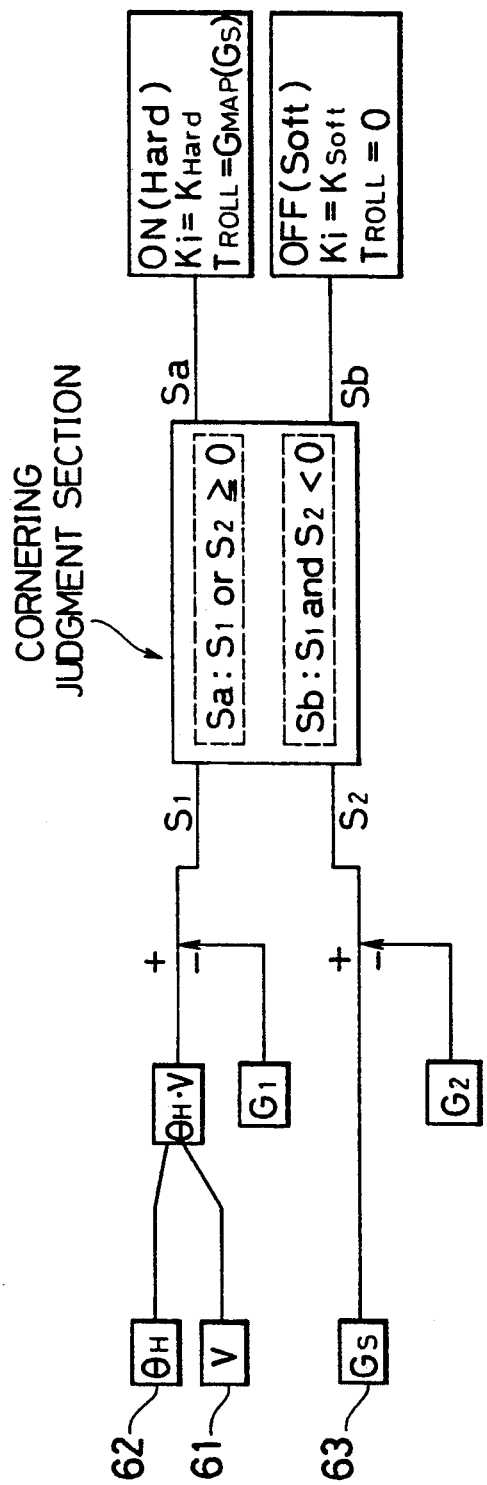

As shown in FIGS. 4 and 5, symbols "+" and "−" indicated on the left-hand side of each of the bounce, pitch and roll control sections represent the way of dealing with the output of each of the right-height pressure sensors for each of the three control sub-modes. On the other hand, the symbols "+" and "−" indicated on the right-hand side of each of the bounce, pitch and roll control sections represent each of the bounce, pitch and roll control sections as suppressing a variation in the posture of the vehicle body and they are opposite to those as indicated on the left-hand side thereof, respectively.

In other words, for the control of the bounce component of the posture of the vehicle, the ride heights on the left-hand and right-hand front side of the vehicle body are added, while the ride heights on the left-hand and right-hand rear side of the vehicle body are added. Each of the addition is subjected to the PD control in the direction of coinciding with a reference ride-height value in accordance with the following formula (1):

$$K_{B1} + [(T_{B2} \times S)/(1 + T_{B2} \times S)] \times K_{B2} \qquad (1)$$

where $K_{B1}$, $K_{B2}$ and $T_{B2}$ are control gains (constant) S is an operator.

For the control of the pitch component of the posture of the vehicle body, the difference obtainable by subtracting the addition between the ride heights on the left-hand and right-hand rear sides of the vehicle body from the ride heights on the left-hand and right-hand front sides thereof is subjected to the PD control in the direction of reaching zero.

Further, for the control of the roll component of the posture of the vehicle body, the addition obtainable by adding the ride height on the left-hand front side of the vehicle body to the ride height on the left-hand rear side thereof is subjected to the PD control so as to coincide with the addition obtainable by adding the ride height on the right-hand front side of the vehicle body to the ride height on the right-hand rear side thereof. In other words, the former and the latter are subjected to the PD control so as to reach a target roll angle.

Each of the control values is obtained for the control of the bounce, pitch and roll components of the posture of the vehicle body in the manner as described hereinabove for each of the cylinder units 1. Then the three control values for each of the cylinder units 1 are added to each other, thereby giving a flow amount (rate) signal $Q_{XFR}$, $Q_{XFL}$, $Q_{XRR}$ or $Q_{XRL}$, for the control of the ride height in the respective positions at the wheels of the vehicle body.

It is to be noted herein that the control formula to be used for the PD control of the pitch component and the roll component is substantially the same as the control formula (1) described hereinabove, except for using a different control gain for the pitch control and the roll pitch control.

(2) Ride comfort control (control over signals from vertical acceleration sensors (G sensors))

The ride comfort control is performed with the attempt to prevent ride comfort from being impaired for the reason resulting from the control over the posture of the vehicle body referred to as paragraph (1) above. For the ride comfort control, the bounce, pitch and roll components of the vertical acceleration, corresponding to the bounce, pitch and roll components of the ride height of the vehicle body for the posture control (1) described hereinabove, are controlled so as to be suppressed by means of a feedback control on the basis of an IPD (integral-proportional-differential) control in accordance with the following formula (2):

$$[T_{B3}/(1+T_{B3} \times S)] \times K_{B3} + K_{B4} + ](T_{B3} \times S)/(1+T_{B3} \times S)] \times K_{B3} \quad (2)$$

where $K_{B3}$, $K_{B4}$ and $T_{B3}$ are control gains (constant), S is an operator.

In the control formula (2) above, the control gains for the bounce control, the pitch control, and the roll control are exclusively set and used.

For the pitch control for the purpose of the ride comfort, an arithmetical mean of the vertical acceleration on the left-hand and right-hand front side of the vehicle body is used as the vertical acceleration on the front side of the vehicle body because only three G sensors are provided for the ride comfort control. For the roll control for the ride comfort control, only the vertical acceleration on the left-hand and right-hand front side of the vehicle body is utilized, and no vertical acceleration on the rear side thereof is utilized.

For the ride comfort control, like the ride height control, the control values for the bounce, pitch and roll control obtained by the IPD control are given for each of the cylinder units 1, and the control values are added to each other for each of the cylinder units 1, thereby eventually producing four flow rate (amount) signals $Q_{GFR}$, $Q_{GFL}$, $Q_{GRR}$ and $Q_{GRL}$ for the ride comfort control.

(3) Warp control (control over signals from pressure sensors)

The warp control is a control for suppressing a twisted or bent condition of the vehicle body B. As the pressure acting upon each of the cylinder units 1 corresponds to the load applied to each of the respective wheels, and twisted or bent condition of the vehicle body B resulting from the load applied to each of the wheels is controlled so as not to be caused to become greater.

Specifically, for the front side of the vehicle body, the feedback control is performed in the direction of making the ratio of the difference of the pressures between the right-hand front wheel and the left-hand front wheel $(P_{FR} - P_{FL})$ to the sum of the pressure of the right-hand front wheel to the pressure of the left-hand front wheel $(P_{FR} + P_{FL})$ a 1:1 ratio. Likewise, for the rear side of the vehicle body, the ratio of the difference of the pressures between the right-hand rear wheel and the left-hand rear wheel, $(P_{RR} - P_{RL})$, to the sum of the pressure of the right-hand rear wheel and the left-hand rear wheel, $(P_{RR} + P_{RL})$, is made a 1:1 ratio. And each of the amounts of a warp between the front and rear sides of the vehicle body is weighted by a weighting factor, $\omega F$, or a factor for determining a control ratio, and each of the posture control as described in the item (1) above and the ride comfort control as described in the item (2) above is weighted by a weighting factor, $\omega A$, or a factor for determining a control ratio. In this control for suppressing the warp of the vehicle body, the control values for the four respective cylinder units are determined as a flow rate (amount) signals, i.e., $Q_{PFR}$, $Q_{PFL}$, $Q_{PRR}$ and $Q_{PRL}$ (%).

All of the control values for the posture control, the ride comfort control and the warp control obtained for each of the cylinder units 1 are then added to each other, thereby eventually giving final flow amount (rate) signals $Q_{FR}$, $Q_{FL}$, $Q_{RR}$ and $Q_{RL}$ for the respective cylinder units 1.

(4) The control gains used for the control formulas in connection with the description of FIG. 4 may be shifted by a control system as shown in FIG. 5.

First, the steering speed $\theta_H$ of the steering wheel is multiplied by the vehicle speed V, and a value S1 obtained by operating a reference value G1 from the resulting product $(\theta_H \times V)$ is inputted into a cornering judgment section. Further, a value S2 obtained by subtracting a reference value G2 from the current transverse acceleration Gs of the vehicle body is inputted into the cornering judgement section.

Figure 6:
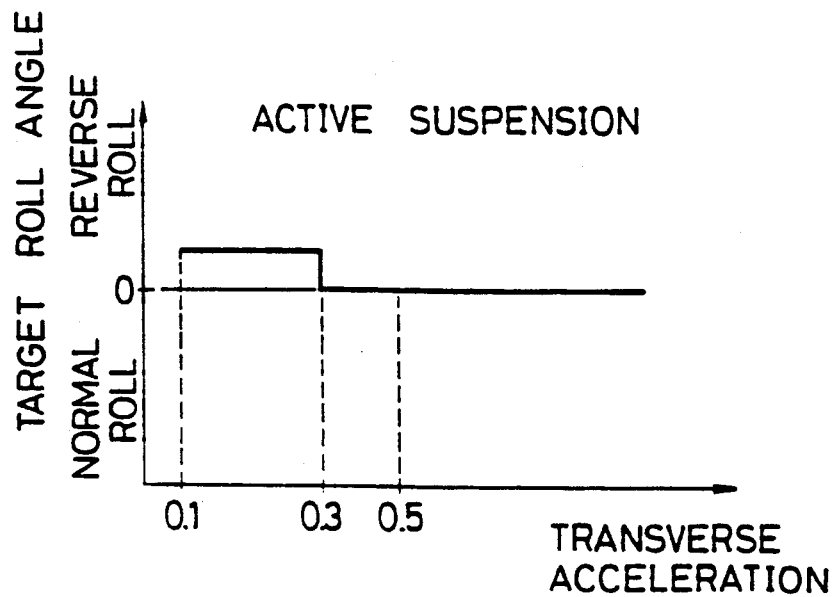
FIG. 6 is a graph showing an example of a roll characteristic in the vehicle with active suspension.
Figure 7:
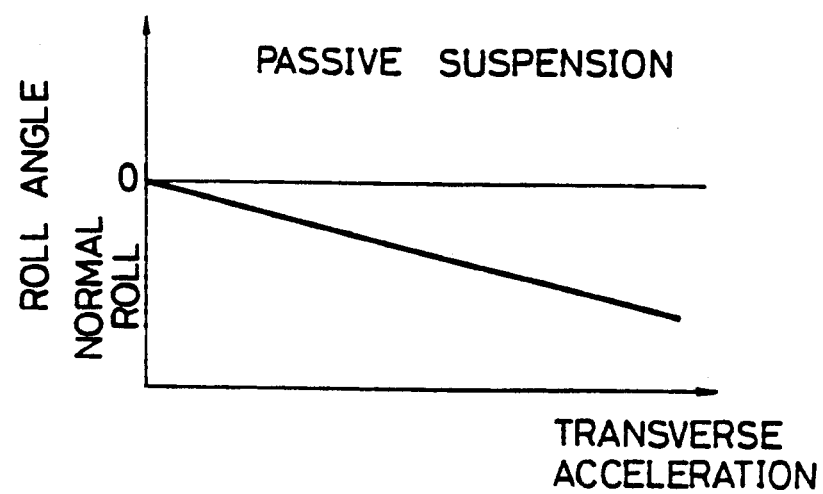
FIG. 7 is a graph showing an example of a roll characteristic in the vehicle with passive suspension.

When the input value S1 or S2 is decided by the cornering judgment section as being equal to or larger than zero, on the one hand, the cornering judgment section determines the vehicle is cornering and generates a signal Sa for converting the suspension characteristics into a hard state, followed by switching the damping-force shifting valve 10 to a contracted position in order to improve a control over the flow rate to each of the liquid pressure cylinders 3. At the same time, each of the proportional constants Ki (i=B1, 2, 3 or 4) is set to $K_{Hard}$ and the target roll angle $T_{Roll}$ is set to a value corresponding to the transverse acceleration (Gs) at that time from a pre-stored map. An example of the a map is shown in FIG. 6. In the case of a passive suspension vehicle, however, the the transverse acceleration increases as the roll angle (normal roll angle) becomes larger, as shown in FIG. 7.

When the input value S1 or S2 is determined by the cornering judgment section as being smaller than zero, on the other hand, the cornering judgment section decides the vehicle as running straight and generates a signal Sb for converting the suspension characteristics to a soft state, followed by shifting the damping-force shifting valve 10 to its open position as well as setting the proportional constant Ki to a normal value, Ksoft, and the target roll angle to $T_{Roll}=0$.

The following is a description of the way of detecting and competing with the trouble of devices to be used for the active control.

For instance, when the device is in trouble as indicated in one of the following modes, the active control is suspended immediately at the time of failure detection, followed by opening the relief control valve 26 and operating the alarm 72.

Mode 1:

The pressure of the main accumulator 22 detected by the sensor 64 does not reach 30 kgf/cm$^2$ or higher in 5 seconds after the ignition switch 71 was turned on.

Mode 2:

The output signal from the pressure sensor 64 is 4.5 volts or higher. The normal range of the output signal ranges from 1 to 4 volts.

Mode 3:

The output signal of the pressure sensor 64 indicates 185 kgf/cm$^2$ or higher.

Mode 4:

The output signal of the pressure sensor 64 does not indicate any rise in the pressure for 5 seconds or longer when the output signal from the pressure sensor 64 indicates the pressure below 100 kgf/cm$^2$ or lower and the active control is suspended.

Mode 5:

Each wire of the sensors and actuators is broken.

Mode 6:

The flow amount (rate) of the operating liquid within the reservoir tank 12 below a predetermined lower limit or lower has been detected continuously for 5 seconds or longer.

Mode 7:

The output signal of each of the cylinder pressure sensors 52 is 0.5 volt or lower or 4.5 volts or higher. The normal range of the pressures for the output signal for each cylinder pressure sensor 52 is in the range from 1 volt to 4 volts.

Mode 8:

The output signal of the ride height sensor 51 is 0.5 volt or lower or 4.5 volts or higher. The normal range of the pressures for the output signal for the ride height sensor 51 is in the range from 1 volt to 4 volts.

Mode 9:

The output signal of each of the G sensors 53 and 63 is 0.5 volt or lower or 4.5 volts or higher for a continuous time period of 1 second or longer. The normal range of the pressures for the output signal for the G sensors 53 and 63 is in the range from 1 volt to 4 volts.

Mode 10:

The output signal of the transverse G sensor 63 is 0.5 volt or lower or 4.5 volts or higher. The normal range of the pressures for the output signal for the transverse G sensor 63.

Mode 11:

There is an error in the central processing unit.

Control for Opening Operation of Control Valve 26

Description will be made of an example of the control for opening the control valve 26 in conjunction with the flowchart as shown in FIG. 8.

First, at step S1, a decision is made to determine if the ignition switch is turned off or not. If the result of decision at step S1 indicates that the ignition switch is not turned off, namely, the pump 11 is driven and the engine is working, the program flow goes to step S2 at which it is decided to determine if the active control system is in trouble. When it is decided at step S2 that the active control system is in trouble, then the program flow proceeds to step S3 at which the first switch valve, i.e., the relief control valve 26, is opened. This operation allows the pressure within the high-pressure line to be released into the reservoir tank 12 in one breath. When the result of decision at step S2 indicates that the active control system is working in a normal way, then the program flow goes to step S4 at which the first switch valve 26 is closed.

On the other hand, when the result of decision at step S1 indicates that the ignition switch is turned off, the pressure within the high-pressure line (common passage 13) is released into the reservoir tank 12 through the release valve 28b. This release of the pressure is performed gradually by means of the variable orifice 28c. At this time, the program flow goes to step S5 at which the signal from the pressure sensor 52m, namely, the pressure P within the common passage 13, is read, followed by proceeding to step S6 at which a decision is made to determine if the pressure P is equal to or lower than a predetermined first pressure P1 that is predetermined to become lower than the pressure value at which the water-hammer phenomenon will be caused to happen even if the pressure would be released. When the result of decision at step S6 indicates that the pressure P is equal to or smaller than the predetermined first pressure P1, on the one hand, the program flow proceeds to step S7 at which the first switch valve 26 is opened. Even if the switch valve 26 would be opened, no water-hammer phenomenon will be caused to occur because the pressure P within the common passage 13 is equal to or lower than the predetermined first pressure P1 that is set to be lower than the pressure at which no water-hammer phenomenon will occur. Thereafter, the program flow goes to step S8 at which a decision is made to determine whether or not the pressure P within the common passage 13 is equal to or lower than a predetermined second pressure P2. When it is decided at step S8 that the pressure P is equal to or lower than the predetermined second pressure P2, then the program flow goes to step S9 at which the system is down, followed by the end of the system. It is noted herein that the predetermined second pressure P2 is set to a value which is sufficiently small and which can be used for detection of the trouble of the first switch valve 26 as will be described hereinafter.

The process from steps S11 to S13 is to investigate the trouble of the second switch valve 28b (release valve). In other words, if the pressure within the high-pressure line (common passage 13) would be maintained at the pressure higher than the predetermined first passage P1 for a period of time longer than the predetermined period of time even after the ignition switch was turned off, it is nothing but no pressure being released through the second switch valve 28b in a sufficient manner. In this case, it is decided at step S12 that the second switch valve 28b is determined to be in trouble, and this result is stored in a ROM at step S13.

The process from steps S14 to S16 is to investigate the trouble of the first switch valve 26. In this process, a decision is made at step S14 to determine if the pressure within the high-pressure line (common passage 13) above the predetermined second pressure P2 is maintained for a predetermined period of time, even if the first switch valve 26 would be opened. When the result of decision at step S14 indicates that the pressure within the high-pressure line is continued for the predetermined time period or longer, the program flow goes to step S15 at which the first switch valve 26 is decided as being in trouble and the pressure is not released through the first switch valve 26 to a sufficient extent. Then at step S16, this result is stored in the ROM.

Variant 1

Figure 9:
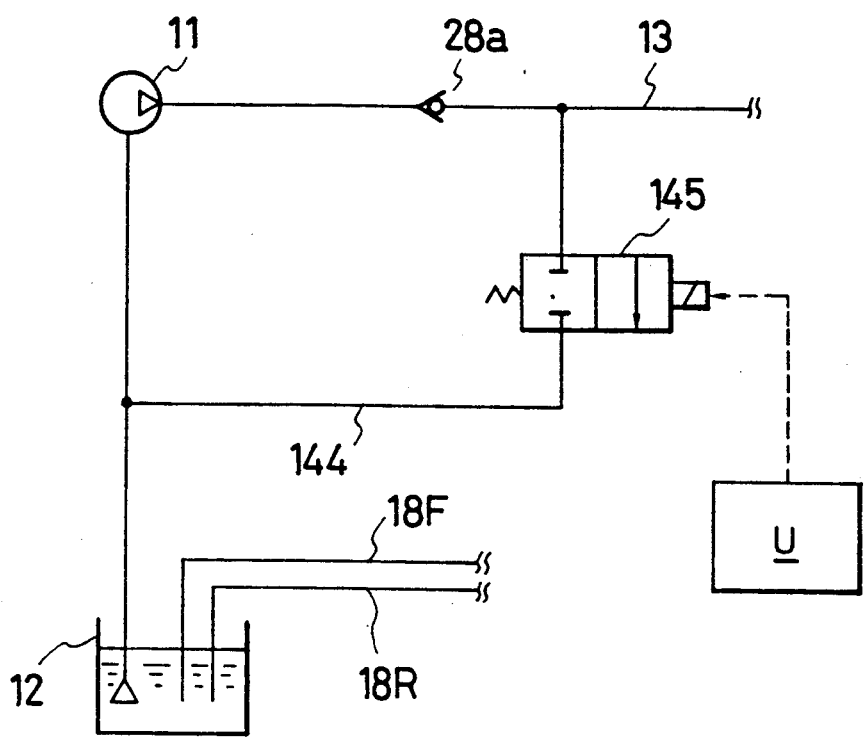
Figure 10:
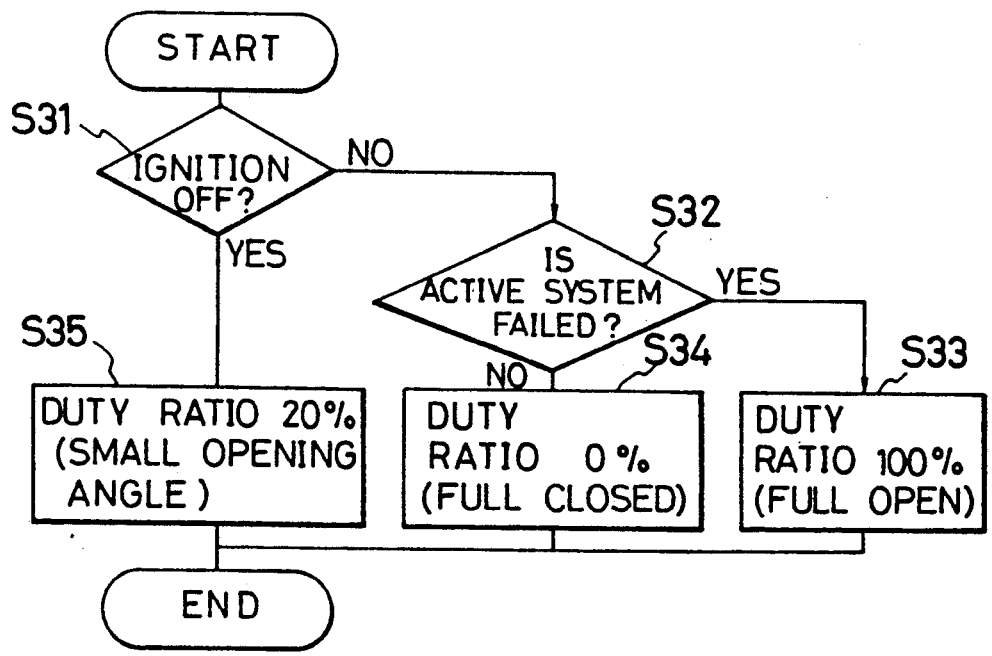

FIGS. 9 and 10 show a variant form of the suspension apparatus according to the present invention, in which the same elements as those indicated in the embodiment described hereinabove are provided with the same reference numerals and symbols and duplicate description is omitted herefrom on those elements as have already been described hereinabove.

As shown in FIG. 9, a relief passage 144 is provided for releasing the pressure within the common passage 13 into the reservoir tank 12 and this relief passage 144 functions as the relief passages 44 and 25 in the embodiment as described hereinabove. To the relief passage 144 is connected a switch valve 145 of an electromagnetic type to be subjected to duty control. The switch valve 145 is of the type which is capable of being controlled by a duty signal (a signal indicative of a duty ratio) from a control unit U. when the duty ratio is 0%, on the one hand, the switch valve 145 assumes its full closed state (an opening angle of zero) as shown in FIG. 9. When the duty ratio is 100%, on the other hand, the switch valve 145 assumes a state that its release valve is displaced to the left from the full closed state to its full open state (an opening angle of 100). Further, when the duty ratio exists between 0% and 100%, a ratio of the closed state to the open state may vary in proportion to the opening angle of the switch valve 145. More specifically, for instance, the duty ratio of 20% means that a substantial opening angle amounts to 20%. In other words, the opening angle of the switch valve 145 increases or decreases in proportion to the duty ratio. The switch valve 145 is said to be a switch valve of a type capable of substantially adjusting the opening angle.

Description will be made of the control of the opening angle of the switch valve 145, for example, in conjunction with the flowchart as shown in FIG. 10.

First, at step S31 (corresponding to step S1 of FIG. 8), a decision is made to determine if the ignition switch is turned off. When the result of decision at step S31 indicates that the ignition switch is not turned off, the program flow goes to step S32 (corresponding to step S2 of FIG. 8) at which a decision is further made to determine if the active control system is in a fail state. If the result of decision at step S32 indicates that the active control system is in a fail state, the program flow goes to step S33 at which a duty signal indicative of the duty ratio of 100% is generated to the switch valve 145, thereby opening the switch valve 145 to a full open state and rapidly releasing the pressure from the common passage 13 to the reservoir tank 12.

When the result of decision at step S32 indicates that the active control system is not in a fail state, the program flow goes to step S34 (corresponding to step S4 of FIG. 8) at which a duty signal indicative of the duty ratio of 0% is generated to the switch valve 145, thereby closing the switch valve 145 to a full closed state.

Referring back to step S31 at which the ignition switch is turned on, the program flow goes to step S35 at which a duty signal indicative of the duty ratio of 20% is generated to the switch valve 145, followed by the opening of the switch valve 145 to an opening angle of 20% to thereby release the pressure within the common passage 13 gradually into the reservoir tank 12. It is to be noted herein that the opening angle of the switch valve 145 may be arranged at step S35 so as to be gradually increased as the time passes.

Variant 2

Figure 11:
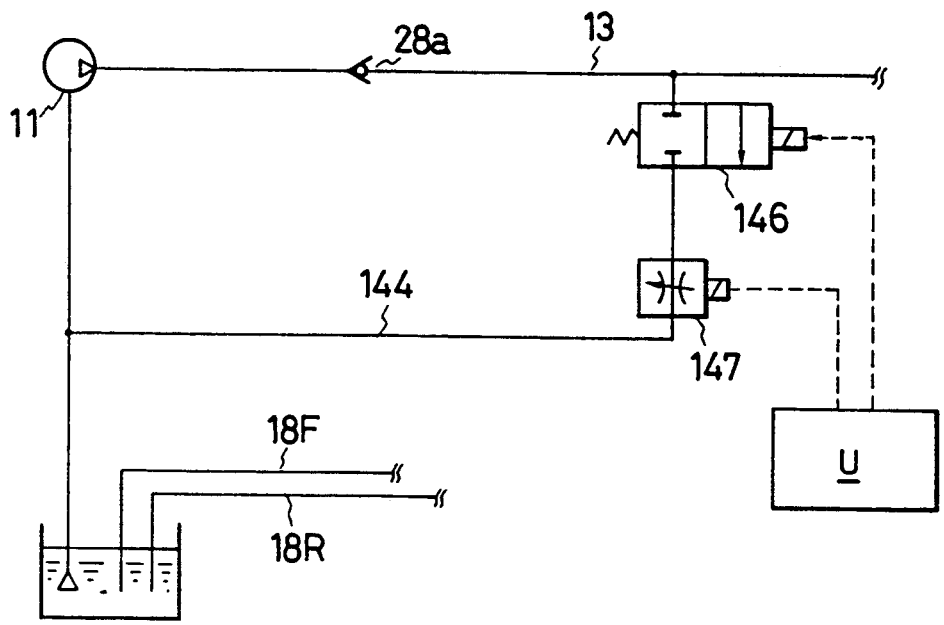
Figure 12:
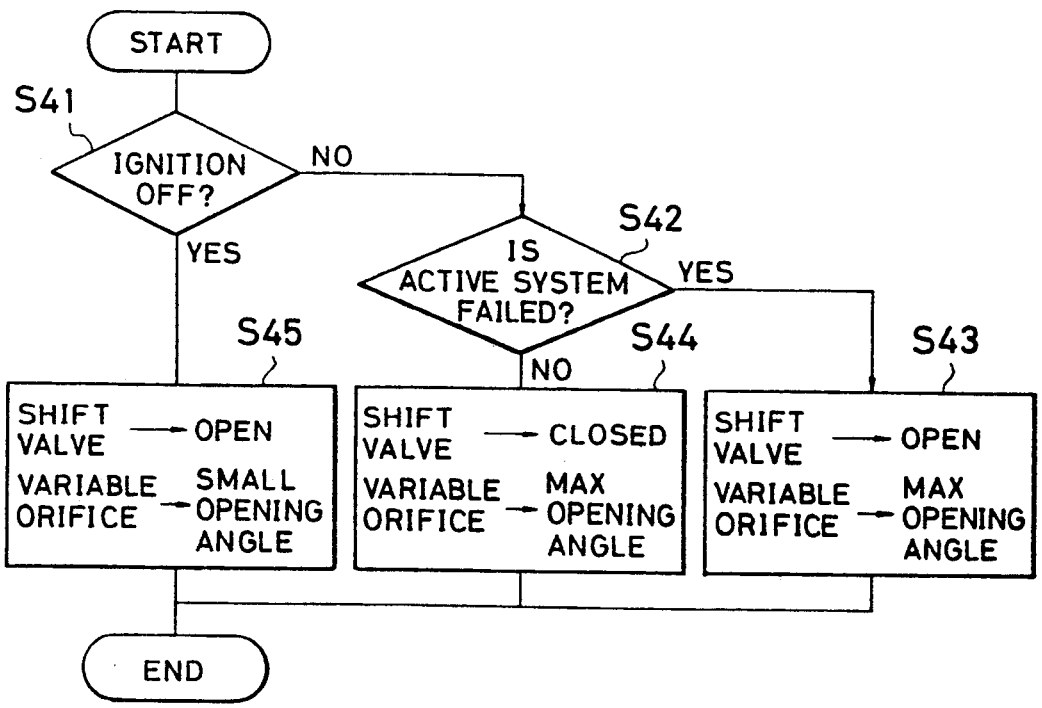

FIGS. 11 and 12 shows another variant form of the suspension apparatus according to the present invention, in which the same elements as those indicated in the embodiment described hereinabove are likewise provided with the same reference numerals and symbols and duplicate description is omitted herefrom on those elements as have already been described hereinabove.

In this embodiment, like the variant form as shown in FIGS. 9 and 10, only one relief passage 144 is provided as a relief passage for releasing the pressure within the common passage 13 into the reservoir tank 12.

To the relief passage 144, a switch valve 146 of an electromagnetic type and a variable orifice 147 of an electromagnetic type are connected in a row. The switch valve 146 is of a type capable of assuming an ON (full open) state and an OFF (full closed) state and the variable orifice 147 is of a type capable of variably assuming at least two opening angles, i.e., a large opening angle and a small opening angle. In this embodiment, the variable orifice 147 is of the type variably and continuously adjusting its opening angle.

The switch valve 146 and the variable orifice 147 can work in association with each other as a control valve of a type capable of substantially adjusting its opening angle, and each of the switch valve 146 and the variable orifice 147 is controlled by the control unit U.

Description will now be made of an example of the control over the switch valve 146 and the variable 147 in conjunction with the flowchart as shown in FIG. 12.

First, at step S41 (corresponding to step S1 of FIG. 8), a decision is made to determine if the ignition switch is turned off. When the result of decision at step S41 indicates that the ignition switch is not turned off, the program flow proceeds to step S42 (corresponding to step S2 of FIG 8) at which a decision is further made to determine if the active control system is in a fail state. When it is decided at step S42 that the active control system is in a fail state, then the program flow goes to step S43 (corresponding to step S3 of FIG. 8) at which the switch valve 146 is opened and the opening angle of the variable orifice 147 is made a maximum opening angle, thereby rapidly releasing the pressure within the common passage 13 into the reservoir tank 12.

On the other hand, when the result of decision at step S42 indicates that the active control system is not in a fail state, the program flow proceeds to step S44 (corres-ponding to step S4 of FIG. 8) at which the switch valve 146 is closed while the variable orifice 147 is set to its maximum opening angle. The reason for setting the variable orifice 147 to its maximum opening angle is because the mode as indicated in step S43 can be taken by opening the switch valve 146. It is to be noted herein that the opening angle of the variable orifice 147 can freely be set.

If the result of decision at step S41 indicates that the ignition switch is turned off, then the program flow goes to step S45 at which the switch valve 146 is opened and the variable orifice 147 is set to a small opening angle (not zero), thereby allowing the pressure within the common passage 13 to be gradually released into the reservoir tank 12. It is to be noted herein that, at step S45, the variable orifice 147 can set its opening angle so as to be gradually increased as the time elapses.

It is to be understood that the foregoing text and drawings relate to embodiments of the invention given by way of examples but not limitation. Various other embodiments and variants are possible within the spirit and scope of the present invention.

We claim:

1. A suspension apparatus of an automotive vehicle having a cylinder unit interposed between a sprung weight and an unsprung weight for performing a control of a posture of a vehicle body by controlling supply or discharge of an operating liquid to or from the cylinder unit under a predetermined condition, comprising:
 a reservoir tank for storing the operating liquid;
 a high-pressure line for supplying the operating liquid of a high pressure to the cylinder unit;
 a pump for pumping the operating liquid up from the reservoir tank and supplying the operating liquid of a high pressure to the high-pressure line;
 a trouble detecting means for detecting a trouble which causes the supply or discharge of the operating liquid to or from the cylinder unit to occur in an abnormal fashion;
 an ignition switch detecting means for detecting an off state of an ignition switch; and
 a flow-rate altering means for releasing the operating liquid of the high-pressure line to the reservoir tank when the trouble is detected by the trouble detecting means or when an off state of the ignition switch is detected by the ignition switch detecting means such that a flow rate produced by the flow-rate altering means at the time when the operating liquid is released is larger at the time when the trouble is detected than at the time when the off state of the ignition switch is detected.

2. A suspension apparatus as claimed in claim 1, wherein the pressure flow-rate altering means comprises:
 a first relief passage and a second relief passage disposed in a position parallel to each other, each connecting the high-pressure line to the reservoir tank;
 a first switch valve connected to the first relief passage; and
 a second switch valve connected to the second relief passage and having its opening angle set to an opening angle which is smaller than an opening angle of the first switch valve;
 wherein the first switch valve is opened when the trouble is detected by the trouble detecting means and the second switch valve is opened when the off state of the ignition switch is detected by the ignition switch detecting means.

3. A suspension apparatus as claimed in claim 2, wherein the first switch valve is of an electromagnetic type and the second switch valve is of a mechanical type which is operated using the pressure in the high-pressure line as a pilot pressure.

4. A suspension apparatus as claimed in claim 2, further comprising a pressure detecting means for detecting a pressure in the high-pressure line;
 wherein the first switch valve is opened subsequent to the opening of the second switch valve when the pressure detected by the pressure detecting means is equal to or lower than a predetermined pressure.

5. A suspension apparatus as claimed in claim 2, further comprising:
 a pressure detecting means for detecting a pressure in the high-pressure line; and
 a trouble determining means for determining a trouble of the second switch valve when the pressure detected by the pressure detecting means is not equal to or lower than a predetermined pressure in a predetermined period of time after the off state of the ignition switch is detected by the ignition switch detecting means.

6. A suspension apparatus as claimed in claim 5, further comprising a memory means for storing the result of determination of the trouble of the second switch valve made by the trouble determining means.

7. A suspension apparatus as claimed in claim 2, further comprising:
 a pressure detecting means for detecting a pressure in the high-pressure line; and
 a trouble determining means for determining a trouble of the first switch valve when the pressure detected by the pressure detecting means is not equal to or lower than a predetermined pressure in a predetermined period of time after the first switch valve is opened.

8. A suspension apparatus as claimed in claim 7, further comprising a memory means for storing the result of determination of the trouble of the first switch valve made by the trouble determining means.

9. A suspension apparatus as claimed in claim 1, wherein the flow-rate altering means comprises a relief passage connecting the high-pressure line to the reservoir tank and a control valve of an electromagnetic type capable of adjusting its opening angle, the control valve being connected to the relief passage; and
 the switch valve is opened at a larger opening angle when the trouble is detected by the trouble detecting means and the switch valve is opened at a smaller opening angle when the off state of the ignition switch is detected by the ignition switch detecting means.

10. A suspension apparatus as claimed in claim 9, wherein the control valve is a switch valve capable of assuming an opening angle ranging from its full open state to its full closed state by means of a duty control.

11. A suspension apparatus as claimed in claim 9, wherein the control valve comprises a switch valve of an electromagnetic type and a variable orifice of an electromagnetic type, which are disposed in series; and
 the switch valve is opened while the variable orifice assumes a larger opening angle when the trouble is detected by the trouble detecting means and the switch valve is opened while the variable orifice assumes a smaller opening angle when the off state of the ignition switch is detected by the ignition switch detecting means.

12. A suspension apparatus of an automotive vehicle, comprising:
 a plurality of cylinder units, each of the cylinder units being interposed at each wheel between a sprung weight and an unsprung weight;
 a reservoir tank for storing an operating liquid;
 a pump for pumping the operating liquid up from the reservoir tank and functioning as a source of supplying the operating liquid of a high pressure;
 a high-pressure line for connecting the pump to the cylinder units, to which the operating liquid of a high pressure pumped by the pump is supplied;
 a supplying control valve connected to the high-pressure line;
 a low-pressure line for connecting the reservoir tank to the cylinder units;
 a discharging control valve connected to the low-pressure line;

a plurality of ride height detecting means, each ride height detecting means for detecting a ride height, or a height of the vehicle body, in a position of each of the respective wheels;

a posture control means for determining an actual posture of the vehicle body on the basis of the ride heights detected by the plurality of the ride height detecting means and for controlling the supplying control valve and the discharging control valve so as for the actual posture of the vehicle body determined to become a predetermined posture thereof;

a trouble detecting means for detecting a trouble which causes supply and discharge of the operating liquid to and from the cylinder unit to occur in an abnormal way;

an ignition switch detecting means for detecting an off state of an ignition switch; and a flow-rate altering means for releasing the operating liquid of the high-pressure line to the reservoir tank when the trouble is detected by the trouble detecting means or when an off state of the ignition switch is detected by the ignition switch detecting means such that a flow rate produced by the flow-rate altering means at the time when the operating liquid is released is larger at the time when the trouble is detected than at the time when the off state of the ignition switch is detected.

13. A suspension apparatus as claimed in claim 12, wherein the flow-rate altering means comprises a relief passage for connecting the high-pressure line to the reservoir tank and an opening angle altering means for altering an opening angle of the relief passage; and wherein the opening angle of the relief passage is altered by the opening angle altering means so as to assume a larger opening angle when the trouble is detected by the trouble detecting means and the opening angle of the relief passage is altered by the opening angle altering means so as to assume a smaller opening angle when the off state of the ignition switch is detected by the ignition switch detecting means.

14. A suspension apparatus as claimed in claim 13, wherein:

the relief passage comprises a first relief passage and a second relief passage disposed in a position parallel to each other;

a first switch valve is connected to the first relief passage and a second switch valve is connected to the second relief passage, the second switch valve being opened at an opening angle which is smaller than an opening angle at which the first switch valve is opened; and the opening angle of the relief passage is substantially altered by the opening angle altering means by opening either of the first switch valve or the second switch valve.

15. A suspension apparatus as claimed in claim 12, wherein the pressure releasing means comprises a a relief passage for connecting the high-pressure line to the reservoir tank and a control valve connected to the relief passage and being of a type capable of adjusting an opening angle of the relief passage.

16. A suspension apparatus as claimed in claim 13, wherein the relief passage is connected to the high-pressure line in a position between the pump and the supplying control valve.

17. A suspension apparatus as claimed in claim 12, wherein the posture control means determines an actual posture of the vehicle body by a bounce component, a pitch component and a roll component of the posture of the vehicle body and controls the actual posture of the vehicle body determined by the bounce component, the pitch component and the roll component of the posture thereof so as to assume a predetermined posture thereof.

18. A suspension apparatus as claimed in claim 17, further comprising:

a vertical acceleration detecting means for detecting vertical acceleration acting upon the vehicle body; and a second control means for controlling the supplying control valve and the discharging control valve so as to suppress the vertical acceleration detected by the vertical acceleration detecting means.

19. A suspension apparatus as claimed in claim 12, wherein each of the supplying control valve and the discharging control valve is constituted by a control valve of a type controlling a flow rate; and a control signal to be generated from the posture control means to the supplying control valve and the discharging control valve is set as a signal indicative of a flow rate.

20. A suspension apparatus as claimed in claim 19, further comprising:

a plurality of pressure detecting means, each being for detecting a pressure within each of the cylinder units independently and separately; and a third control means for controlling the supplying control valve and the discharging control valve so as to suppress a warping force acting between a front portion and a rear portion of the vehicle body on the basis of the pressures detected by the plurality of the pressure detecting means.

21. A suspension apparatus as claimed in claim 12, wherein a gas spring is connected independently and separately to each of the cylinder units.

22. A suspension apparatus of an automotive vehicle having a cylinder unit interposed between a sprung weight and an unsprung weight for performing control of a posture of a vehicle body by controlling supply or discharge of an operating liquid to or from the cylinder unit under a predetermined condition, comprising:

a reservoir tank for storing the operating liquid;

a high-pressure line for supplying the operating liquid at a high pressure to the cylinder unit;

a pump for pumping the operating liquid up from the reservoir tank and supplying the operating liquid at a high pressure to the high-pressure line;

a trouble detecting means for detecting a trouble which causes the supply or discharge of the operating liquid to or from the cylinder unit to occur in an abnormal fashion;

an ignition switch detecting means for detecting a state of an ignition switch in which the ignition switch is turned off;

a relief passage for releasing the pressure in the high-pressure line to the reservoir tank; and a flow-rate altering means for altering a flow rate through the relief passage so that the flow rate becomes larger when a trouble is detected by the trouble detecting means than when an ignition switch is turned off, where the flow rate through the relief passage is set normally to zero.

23. A suspension apparatus of an automotive vehicle, comprising:

a plurality of cylinder units, each being interposed at each wheel between a sprung weight and an unsprung weight;

a reservoir tank for storing an operating liquid;

a pump for pumping the operating liquid up from the reservoir tank and functioning as a source of supplying the operating liquid at a high pressure;

a high-pressure line for connecting the pump to the cylinder units, to which the operating liquid at a high pressure pumped up by the pump is supplied;

a supplying control valve connected to the high-pressure line;

a low-pressure line for connecting the reservoir tank to the cylinder units;

a discharging control valve connected to the low-pressure line;

a plurality of ride height detecting means, each ride height detecting means for detecting a ride height, or a height of the vehicle body, in a position at each of the respective wheels;

a posture control means for determining an actual posture of the vehicle body on the basis of the ride heights detected by the plurality of the ride height detecting means and for controlling the supplying control valve and the discharging control valve so that the actual posture of the vehicle body determined by the plurality of ride height detecting means is set as a predetermined posture of the vehicle body;

a trouble detecting means for detecting a trouble which causes the supply or discharge of the operating liquid to or from the cylinder unit to occur in an abnormal fashion;

an ignition switch detecting means for detecting a state of an ignition switch in which the ignition switch is turned off;

a relief passage for releasing the pressure in the high-pressure line to the reservoir tank; and a flow-rate altering means for altering a flow rate through the relief passage so that the flow rate becomes larger when a trouble is detected by the trouble detecting means than when an ignition switch is turned off, where the flow rate through the relief passage is set normally to zero.

* * * * *